United States Patent [19]

Sailer et al.

[11] 3,943,122

[45] Mar. 9, 1976

[54] POLYAZO COMPOUNDS CONTAINING BENZHYDROL AS A COMPONENT

[75] Inventors: Andre Louis Sailer; Pierre Frank, both of Saint Clair du Rhone, France

[73] Assignee: Pechiney Ugine Kuhlmann, Paris, France

[22] Filed: Jan. 14, 1972

[21] Appl. No.: 217,950

[30] Foreign Application Priority Data
Jan. 14, 1971  France .............................. 71.01106

[52] U.S. Cl. ............... 260/169; 260/173; 260/174; 260/184; 260/185; 260/196; 260/206; 260/207; 260/208; 260/148; 260/145 C; 260/512 C; 260/618 B; 8/13; 260/520 R

[51] Int. Cl.$^2$ D06P 1/39; C09B 33/04; C09B 33/18; C09B 45/24

[58] Field of Search........ 260/145 C, 169, 170, 172, 260/173

[56] References Cited
UNITED STATES PATENTS

| | | | |
|---|---|---|---|
| 2,018,234 | 10/1935 | Smith et al. ........................ | 260/169 |
| 2,061,545 | 11/1936 | Bosshart et al. ..................... | 260/169 |
| 2,259,735 | 10/1941 | Grossley et al. ................. | 260/169 X |
| 2,394,114 | 2/1946 | Siebert et al. ........................ | 260/172 |
| 2,750,375 | 6/1956 | Siebert et al. .................... | 260/169 X |

FOREIGN PATENTS OR APPLICATIONS 1,503,833   10/1967   France ............................ 260/145 C

*Primary Examiner*—Floyd D. Higel
*Assistant Examiner*—C. F. Warren
*Attorney, Agent, or Firm*—Browne, Beveridge, De Grandi & Kline

[57] ABSTRACT

Azo dyestuffs of the formula:

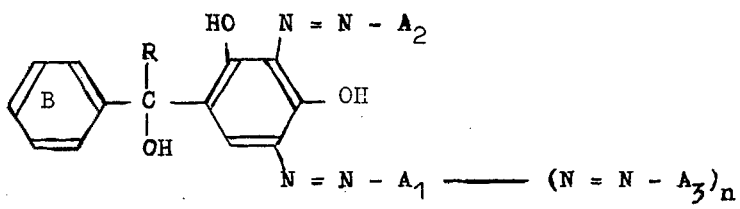

(I)

in which n is zero or 1, R represents a hydrogen atom or an alkyl or aryl group, $A_1$, $A_2$ and $A_3$ each represent the residue of a diazotisable aromatic primary amine, which may be the same or different with at least one of these residues containing at least one sulphonic or carboxylic acid group, and the nucleus B is unsubstituted or substituted by one or two nitro, hydroxy or water-solubilising groups, metalliferous complexes of such dyestuffs and salts of the dyestuffs and of their metalliferous complexes. The dyestuffs of the above formula where n is zero may be prepared by a process which comprises coupling the diazo derivative of a diazotisable aromatic primary amine or the diazo derivatives of two different amines $A_1NH_2$ and $A_2NH_2$ with a coupling compound of the formula:

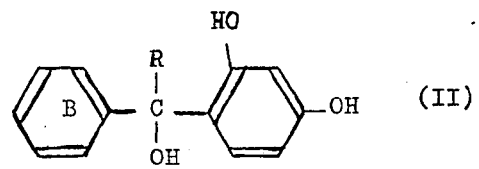

(II)

in which B and R have the same meaning as in claim 1, at the rate of two molecules of amine to each molecule of coupling compound. The dyestuffs of the above formula where n is 1 may be prepared by a process which comprises coupling a coupling compound of the formula:

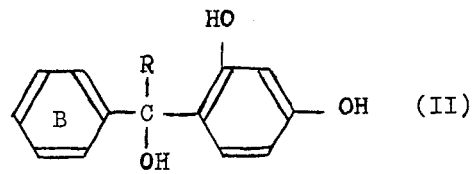

(II)

in which B and R have the same meanings as in claim 1 with the diazo derivative of a diazotisable aromatic primary amine $A_1$—$NH_2$, having a coupling position, at the rate of one molecule of amine to each molecule of coupling compound, then the monoazo dye thus obtained is coupled with the diazo derivative of a diazotisable aromatic primary amine or with the diazo derivatives of two different amines $A_2$—$NH_2$ and $A_3$—$NH_2$. The dyestuffs are particularly suitable for dyeing or finishing leathers.

5 Claims, No Drawings

POLYAZO COMPOUNDS CONTAINING BENZHYDROL AS A COMPONENT

The present invention relates to new azo dyestuffs which are particularly interesting for the dyeing or finishing of leathers.

In French Pat. No. 1,165,637 azo dyestuffs derived from 2,4-dihydroxy-benzophenone are described. However, these dyestuffs have only a weak affinity for leather. Moreover, the production of the above-mentioned benzophenone requires large quantities of phosphorus acid, phosphorus oxychloride or boron trifluoride, and consequently can only be carried out in special and costly apparatus.

It has been found that strong shades, which are very fast to light, wet tests, solvents, rubbing and grinding, can be obtained on leathers from different tanning processes with novel dyes of the general formula:

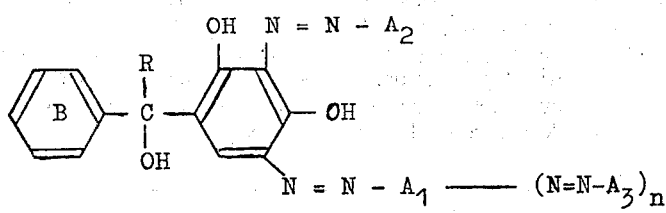

and metalliferous complex derivatives thereof. In formula (I), R represents a hydrogen atom or an alkyl or aryl group, $A_1$, $A_2$ and $A_3$ each represent the residue of a diazotisable aromatic primary amine, which may be the same or different, with at least one of the residues containing at least one sulphonic or carboxylic acid group, $n$ is zero or 1 and the nucleus B is unsubstituted or substituted by one or two nitro, hydroxy or water-solubilising groups.

Suitable water-solubilising groups are the sulpho and carboxy groups.

The invention includes dyestuffs of formula (I) and their metalliferous complexes in the form of their salts with amines or ammonium compounds.

The dyestuffs of formula (I), in which $n$ is zero, can be prepared for example by coupling the diazo derivative of an aromatic primary amine or the diazo derivative of two amines of this type with a coupling compound of the formula:

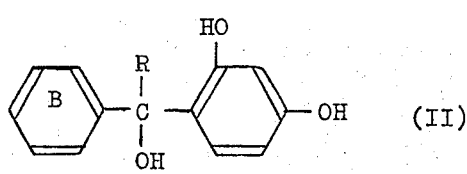

in which B and R have the same meaning as above at the rate of two molecules of amine to each molecule of coupling compound of formula (II). The dyestuffs of formula (I), in which $n$ is zero and $A_1$ and $A_2$ are different, may for example be advantageously prepared by successively coupling the diazo derivatives of amines $A_1$—$NH_2$ and $A_2$—$NH_2$. The couplings take place in the ortho position to the hydroxy groups.

The dyestuffs of formula (I), in which $n$ equals 1, can be prepared for example by coupling a coupling compound of formula (II) with the diazo derivative of an aromatic primary amine $A_1$—$NH_2$, having a coupling position at the rate of one molecule of amine to each molecule of coupling compound, and then by coupling the monoazo dye thus obtained with the diazo derivative of a diazotisable aromatic primary amine or the diazo derivatives of two amines of this type.

The dyestuffs of formula (I), in which $n$ equals 1 and $A_2$ and $A_3$ represent different residues, may for example be advantageously prepared by successively coupling the diazo derivatives of the amines $A_2$—$NH_2$ and $A_3$—$NH_2$.

The amines $A_1$—$NH_2$, $A_2$—$NH_2$ and $A_3$—$NH_2$ may belong to the most diverse series, such as for example the benzene, naphthalene, and heterocyclic or azo series, and have up to three substituents. At least one of these amines must have at least one carboxylic or sulphonic acid group. Other substituents are, for example, halogen atoms, methyl, ethyl, hydroxy, methoxy, ethoxy, carboxy-methoxy, amino, acetylamino, oxalylamino or nitro groups. Thus one may use, for example, the anilines and their sulphonated derivatives, the naphthylamines and their sulphonated derivatives, the amino phenols or amino naphthols and their sulphonated derivatives and the aminodiphenylamines and their sulphonated derivatives.

The coupling compounds of formula (II) can be prepared, for example, by condensing resorcinol in an alkaline medium with a compound of the formula:

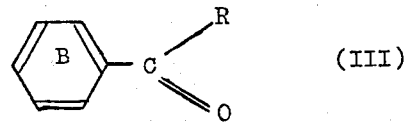

in which B and R have the same meaning as in formula (I).

The dyestuffs of formula (I) are water-soluble. They dye leathers from different tanning processes in shades of brown, which are bright and very fast, particularly to light, wet tests, solvents and to mechanical actions.

The dyestuffs of formula (I), in which one of the residues $A_1$ or $A_2$ has a group in the ortho position to the azo linkage capable of taking part in the formation of a complex, for example a hydroxy, amino, alkoxy, carboxy or $OCH_2$—$COOH$ group can be converted into metalliferous complexes containing one or less than one atom of metal to each molecule of dyestuff. The metal can be, for example, iron, copper, chromium, cobalt or nickel. The conversion into a metalliferous complex can be effected for example by any process of metallization in an aqueous medium or in a mixture of water and organic solvent such as alcohol, polyol, formamide or dimethylformamide, at a temperature between 10° and 150°C. and at a pH of between 1 and 11, preferably between 5 and 8. Examples of metallizing agents are metal chlorides, fluorides, acetates, sulphates, oxides and hydroxides, as well as alkali metal chromates and dichromates. The metalliferous complexes thus obtained provide shades on leather of excellent fastness, particularly to light.

The dyestuffs of formula (I) and their metalliferous complexes can be converted into salts by means of an amine or a quaternary ammonium salt. Examples of suitable amines are arylguanidines, cyclohexylamine or dicyclohexylamine. The salts obtained are insoluble in water, but are soluble in organic solvents, in particular in alcohols and diols. Examples of suitable ammonium salts are dimethyl benzyl alkyl ammonium chlorides, acetates or sulphates and 2'-hydroxy-ethyl trimethylammonium chloride. The salified derivatives can be used for the colour finishing of leather, for example for the aniline finishing of skins either previously dyed or undyed, and the finishing of leathers with a buffed or artificial hair side and the spray-gun dyeing of full grain leathers, on which they give transparent shades, which are very bright and very fast, particularly to light and wet rubbing.

The invention is illustrated by the following Examples, in which the parts given are parts by weight unless the contrary is indicated.

EXAMPLE 1

15 parts of an aqueous solution of hydrochloric acid 20°Be are added to the solution of the diazo derivative of 17.3 parts of p-sulphanilic acid, then a solution at pH 11 of 21.6 parts of 2,4-dihydroxy-benzhydrol in 600 parts of iced water. The coupling reaction is allowed to develop partially for two hours then in an hour a solution of 11 parts of sodium carbonate in 110 parts of water is added. When the coupling is finished, 35 parts of sodium carbonate are added, then in 30 minutes, and at 5°C., the diazo derivative obtained from 13.8 parts of 4-nitro-aniline is also added. When the coupling is completed, one isolates the monosodium salt of [4-nitro-benzene] - <1 azo 3> - [2,4-dihydroxy-benzhydro] - <5 azo 1> - [4-sulpho-benzene] by salting out with sodium chloride. It dyes leathers from different tanning processes fast shades of yellow-brown.

EXAMPLE 2

If, in the previous Example, one replaces the 4-nitro-aniline by 17.3 parts of p-sulphanilic acid, one obtains the disodium salt of 3,5-bis(4-sulpho-phenylazo)-2,4-dihydroxy-benzhydrol which dyes leathers from different tanning processes shades, which are slightly more yellow.

The same dye is obtained if, in 30 minutes, the diazo derivative of 34.6 parts of p-sulphanilic acid is added to a solution at pH 11 and at 5°C., of 21.6 parts of 2,4-dihydroxy-benzhydrol in 400 parts of water, to which 45 parts of sodium carbonate has been added.

EXAMPLE 3

In the usual way, 19.9 parts of 4,6-dinitro-2-amino-phenol are diazotised and, in 30 minutes, the diazo derivative obtained is added to a solution at pH 11 of 21.6 parts of 2,4-dihydroxy-benzhydrol in 400 parts of water at 5°C. to which 45 parts of sodium carbonate have been added. The coupling is very rapid. When it is finished, the diazo derivative of 17.3 parts of p-sulphanilic acid is added in 30 minutes. When the coupling is completed, one isolates the monosodium salt of [4-sulpho-benzene] - <1 azo 3> - [2,4-dihydroxy-benzhydro] - <5 azo 1> - [3,5-dinitro-2-hydroxy-benzene]. It dyes the leathers from different tanning processes in red-brown shades, which are very bright and very fast to the usual tests.

The following Table summarises other Examples of analogous preparation. The disazo dyestuffs are obtained by coupling the 2,4-dihydroxy-benzhydrol firstly with the diazo derivatives of the amino $A_1$—$NH_2$ then by coupling the dyestuff thus obtained with the diazo derivative of the amine $A_2$—$NH_2$.

| Example | Amine $A_1$—$NH_2$ | Amine $A_2$—$NH_2$ | Shade on leather |
|---|---|---|---|
| 4 | 1-amino-naphthalene-6 sulphonic acid | 4-amino-4'nitro-diphenyl-amine-2'-sulphonic acid | red-brown |
| 5 | " | p-sulphanilic acid | orange brown |
| 6 | 1-amino-naphthalene-4 sulphonic acid | 4-nitro- aniline | " |
| 7 | " | 4-nitro-aniline-2-sulphonic acid | " |
| 8 | " | 2-nitro-aniline | " |

EXAMPLE 9

In the usual way, 31.9 parts of 1-amino-8-naphthol-3,6-disulphonic acid are diazotised and the diazo derivative obtained is added in 30 minutes to a solution, at pH 11 and at 5°C., of 21.6 parts of 2,4-dihydroxy-benzhydrol in 400 parts of water, to which has been added 30 parts of a 36°Be solution of sodium hydroxide and 45 parts of sodium carbonate. When the coupling is completed, the diazo derivative of 61.8 parts of 4-amino-4'-nitro-diphenylamine-2'-sulphonic acid is added. When the coupling is finished, one isolates the tetrasodium salt of the [4'-nitro-2'-sulpho-diphenylamine] <4 azo 3> - [2,4-dihydroxy-benzhydrol]-<5 azo 1> - [8-hydroxy-3,6-disulpho-naphthalene] - <7 azo 4> - [4'-nitro-2'-sulpho-diphenylamino]. It dyes leathers from different tanning processes a dark brown.

EXAMPLE 10

As in the previous Example, one prepares the monoazo dyestuff resulting from the coupling of the diazo derivative of 31.9 parts of 1-amino-8-naphthol-3,6-disulphonic acid with 21.6 parts of 2,4-dihydroxy-benzhydrol, then one adds the diazo derivative of 19.9 parts of 4,6-dinitro-2-amino-phenol in 30 minutes. When the coupling is finished, one adds the diazo derivative of 13.8 parts of 4-nitro-aniline and isolates the trisazo dyestuff. It dyes leathers from different tanning processes in shades of dark red brown.

EXAMPLE 11

If, in the previous Example, the 4,6-dinitro-2-aminophenol is replaced by 30.9 parts of 4-amino-4'-nitrodiphenylamine-2'-sulphonic acid, a dyestuff is obtained which dyes leathers from different tanning processes in shades which are more yellow.

EXAMPLE 12

If, in Example 10, the 4,6-dinitro-2-amino-phenol is replaced by 12.3 parts of 2-methoxy aniline and the 4-nitro aniline by 30.9 parts of 4-amino-4'-nitro-diphenylamine-2'-sulphonic acid, one obtains a dyestuff which dyes leathers from different tanning processes in shades which are much more yellow.

EXAMPLE 13

94.9 parts of the disodium salt of the dyestuff obtained in Example 10 are dissolved in 1,000 parts of water and then 8.2 parts of ferric chloride in solution in 50 parts of water are added. The pH is raised to 5.5 by adding an aqueous sodium hydroxide solution and the mixture is left under agitation for 2 hours. The iron complex is then isolated. It dyes leathers from different tanning processes in dark brown shades, which are particularly fast to the usual tests.

EXAMPLE 14

63.2 parts of the sodium salt of the dyestuff of Example 3 are dissolved in 1,000 parts of water and then a solution of 25 parts of copper sulphate pentahydrate in 200 parts of water is added and the pH is raised to 6.5 by adding a sodium hydroxide solution. The mixture is heated to 70°C. and kept at that temperature for one hour. The copper complex is then isolated. It dyes leathers from different tanning processes in red brown shades which are particularly fast to the usual tests.

EXAMPLE 15

13.4 parts of chromium sulphate octahydrate and 15 parts of sodium acetate are added to the solution of 63.2 parts of the monosodium salt of the dyestuff of Example 3 in 1,000 parts of water. The mixture is heated to 90°C. and maintained at this temperature for two hours. The chromium complex is isolated. It contains one atom of chromium to each two molecules of dyestuff of Example 3. It dyes leathers from different tanning processes in red brown shades, which are particularly fast to the usual tests.

EXAMPLE 16

69.3 parts of the copper complex described in Example 14 (monosodium salt) are dissolved in 2000 parts of water at 60°C. Then, 23.9 parts of di-ortho-tolylguanidine in solution in 250 parts of water and 11 parts of 10N hydrochloric acid are added in an hour. The dyestuff in the form of an amine salt is filtered, washed in water and dried. It is totally insoluble in water but easily soluble in alcohols such as ethanol and in the monomethyl ether of ethylene glycol. The alcoholic solutions, when diluted, are violet-brown.

EXAMPLE 17

A sample of 100 parts of shaved clear chorme box calf is rinsed, neutralised and then rinsed again. This leather is placed in a fulling machine containing a solution of 1 part of the dyestuff of Example 10 in 500 parts of water at 60°C. It is fulled for 45 minutes at 60°C. then a tawing paste suspended in 50 parts of water is added by means of a dispersing agent and the leather is fulled for another 30 minutes. The box calf is dyed a deep red brown shade, which is fast to light, washing and solvents.

EXAMPLE 18

100 parts of clear chrome suede leather are rewetted in the presence of a little ammonia, rinsed and put into a fulling machine containing a solution of 6 parts of the dyestuff of Example 13 in 2,000 parts of water at 60°C. The leather is fulled for one hour at 60°C., then 3 parts of formic acid are added, and it is fulled for another 30 minutes. The leather is dried and subjected to the usual mechanical treatment. A vivid, deep brown shade is obtained, which is fast to light, washing, solvents and sueding.

EXAMPLE 19

Two layers of a solution of 10 parts of the dyestuff of Example 16, as the salt, in 100 parts of the monomethyl ether of ethylene glycol and 250 parts of ethanol are applied on the hair side of unsplit calf skin. This is dried then a layer of a binding agent, possibly coloured with the preceding solution to increase its covering ability, is applied. This is dried, another layer of binding agent is applied and then it is dried again. It is fixed with a solution of formaldehyde, dried, polished and faced. In this way, the leather is evenly dyed a violetbrown shade which is particularly fast to light, solvents, washing and mechanical action. The finish thus obtained is particularly transparent and allows the grain of the leather to appear.

EXAMPLE 20

The operation is carried out as in the second paragraph of Example 2, but the p-sulphanilic acid is replaced by 43.4 parts of 3-carboxy-4-amino-benzenesulphonic acid. Thus 3,5-bis(2-carboxy-4-sulpho-phenyl azo)-2,4-dihydroxybenzhydrol is obtained which dyes leathers from different tanning processes orange-brown shades with a tinctorial yield which is practically double that of 3,5-bis(2-carboxy-4-sulpho-phenylazo)-2,4-dihydroxy-benzophenone (French Pat. No. 1,165,637).

We claim:

1. An azo dyestuff of the formula:

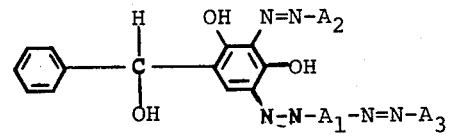

in which $A_1$ represents phenylene or naphthylene, $A_2$ and $A_3$ each represents phenyl, naphthyl or diphenylamine, $A_1$, $A_2$ and $A_3$ being the same or different with at least one of them containing at least one sulfonic or carboxylic acid substituent, $A_1$, $A_2$ and $A_3$ having up to 3 substituents selected from the group consisting of —$SO_3H$, —COOH, halogen, methyl, ethyl, hydroxy, methoxy, ethoxy, carboxymethoxy, acetylamino or nitro, or the salt thereof with cyclohexylamine, dicyclohexylamine or 2'-hydroxyethyl trimethylammonium chloride.

2. The salt of the dyestuff claimed in claim 1 with cyclohexylamine, dicyclohexylamine or 2'-hydroxyethyl trimethylammonium chloride.
3. [4′-nitro-2′-sulpho-diphenylamine] - <4 azo 3> - [2,4-dihydroxy-benzhydrol] - <5 azo 1> - [8-hydroxy-3,6-disulpho-naphthalene] - <7 azo 4> - [4′-nitro-2′-sulphodiphenylamine].
4. The dyestuff or the formula:
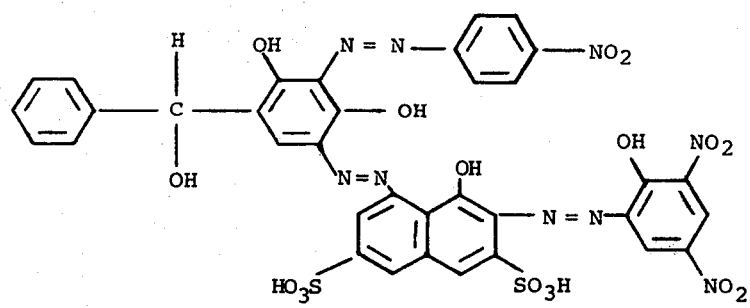
5. The dyestuff of the formula:
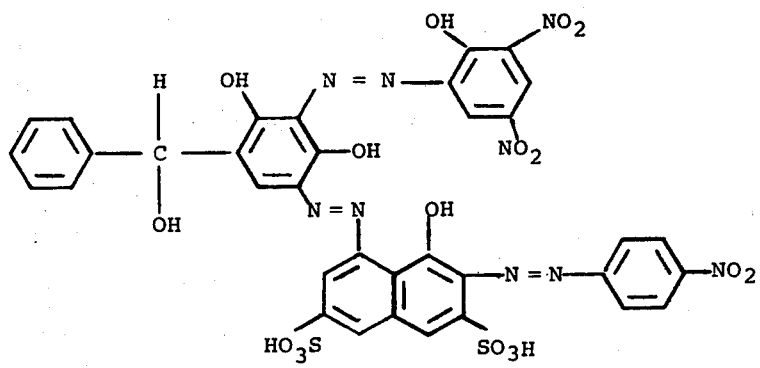
* * * * *